United States Patent [19]

Hansen

[11] Patent Number: 5,520,065
[45] Date of Patent: May 28, 1996

[54] INCREMENTAL SPEED REDUCTION UNIT

[75] Inventor: Robert E. Hansen, Salisbury, Md.

[73] Assignee: Dresser Industries, Inc., Dallas, Tex.

[21] Appl. No.: 216,186

[22] Filed: Mar. 22, 1994

[51] Int. Cl.$^6$ .................................................. F16H 27/08
[52] U.S. Cl. ............................................. 74/435; 74/112
[58] Field of Search ................................. 74/435, 84 R, 74/112; 475/338, 339

[56]  References Cited

U.S. PATENT DOCUMENTS

| | | | |
|---|---|---|---|
| 399,733 | 3/1889 | Boehme | 475/269 |
| 991,754 | 5/1911 | Schoonmaker . | |
| 1,305,616 | 6/1919 | Norris | 475/269 |
| 1,804,037 | 5/1931 | St. Pierre | 475/269 |
| 2,881,630 | 4/1959 | Opocensky | 74/435 |
| 3,481,222 | 12/1969 | Baron | 475/344 |
| 3,596,538 | 8/1971 | Braun | 475/342 |
| 3,999,704 | 12/1976 | Seitz | 235/94 R |
| 4,012,964 | 3/1977 | Lee | 74/435 |
| 4,096,763 | 6/1978 | Kell | 475/338 |
| 4,461,401 | 7/1984 | Sasnett, Jr. . | |

FOREIGN PATENT DOCUMENTS 230985  1/1960  Australia .................................. 74/435

*Primary Examiner*—Rodney H. Bonck
*Assistant Examiner*—Sherry Estremsky
*Attorney, Agent, or Firm*—Haynes and Boone

[57]  ABSTRACT

An incremental speed reduction unit mounted between a fluid meter and a totalizer for reducing the speed at which the totalizer operates comprises a drive gear rotatably supported on a shaft and drivingly rotated by the fluid meter. A ring shaped gear integrally formed on an inside surface of the drive gear has a single set of gear teeth radially extending from the surface thereof. An idler gear rotatably supported on another shaft and drivingly rotated by the ring shaped gear has two sets of interspaced gear teeth of different lengths for incrementally causing the idler gear to rotate upon engagement of the teeth of the ring shaped gear. A driven gear connected to the first shaft is drivingly rotated by the idler gear and communicates such rotation to the totalizer.

17 Claims, 3 Drawing Sheets

INCREMENTAL SPEED REDUCTION UNIT

FIELD OF THE INVENTION

The present invention relates in general to an incremental speed reduction unit, and more particularly, to such a unit housed in a gasoline dispenser for reducing the speed of an output shaft driving a mechanical totalizer.

BACKGROUND OF THE INVENTION

Gasoline dispensers include hydraulically driven fluid meters that, in turn, drive both electrical and mechanical devices that record the amount of fuel dispensed. The electrical device includes a computer and display device that provides the customer with the number of gallons of fuel dispensed and its respective cost. The mechanical device includes a mechanical totalizer driven by the output shaft of a gear assembly connected to a fluid meter for maintaining a cumulative total of the overall amount of fuel dispensed from the dispenser.

However, mechanical totalizers of this type are prone to premature failure due to the high speed at which they are driven since the high speed of rotation of the output shaft often causes premature failure of the totalizer parts.

SUMMARY OF THE INVENTION

It is an object of the present invention to provide a speed reduction unit which transfers torque between a fluid meter and a mechanical totalizer of a gasoline dispenser and which reduces the speed of the totalizer by a relatively large factor.

It is another object of the present invention to provide a speed reduction unit of the above type which increases the useful service life of the totalizer.

It is a further object of the present invention to provide a speed reduction unit of the above type which is completely concealed to discourage tampering.

It is a still further object of the present invention to provide a speed reduction unit of the above type that utilizes existing input and output devices of the gasoline dispenser thereby allowing retrofit of existing dispensers and minimizing the impact on external component design.

Towards the fulfillment of these and other objects, the speed reduction unit of the present invention includes an inverted cup-shaped drive gear rotatably disposed on a fluid meter support and driven by a fluid meter. A ring shaped gear having a single set of gear teeth is integrally formed concentrically within the drive gear for driving an idler gear. The teeth of the ring shaped gear engage the teeth of the idler gear once per rotation causing the idler gear to rotate in quarter turn increments. The idler gear, in turn, meshes with a driven gear mated with the output shaft of the reduction unit. The shaft is connected to a mechanical totalizer by a flexible steel-wrapped cable that translates rotation of the shaft into the amount of gallons of fuel dispensed from the gasoline dispenser.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DESCRIPTION OF THE PREFERRED EMBODIMENT

Figure 1:
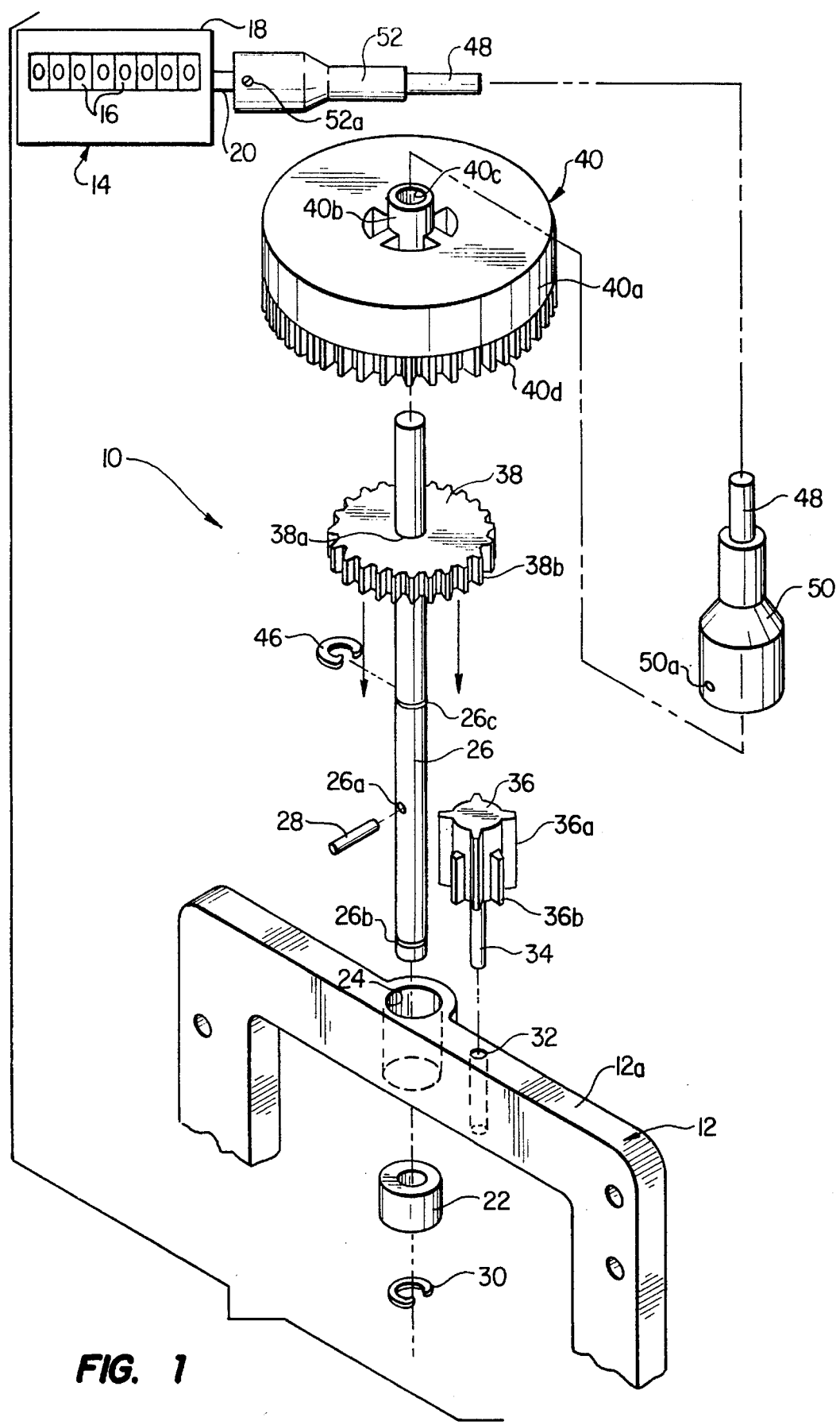
FIG. 1 is an exploded, perspective view of the present invention.

In FIG. 1, the reference numeral 10 designates an incremental speed reduction unit embodying features of the present invention as will be described in conjunction with a gasoline dispenser, although those skilled in the art will recognize other uses for such an invention. The reduction unit 10 is supported by a support bracket 12 which also supports a fluid meter (not shown, but understood to be mounted to the bracket 12 in a conventional manner) and is adapted to drive a mechanical totalizer 14. The totalizer 14 comprises a plurality of numbered wheels 16 contained within a housing 18 that are rotated by a shaft 20 as described below to indicate the amount of fuel dispensed through the gasoline dispenser.

The bracket 12 is preferably formed out of aluminum and includes a generally horizontal upper member 12a for supporting the reduction unit 10. More particularly, a bushing 22 is press fit within a bore 24 extending vertically through the member 12a and rotatably receives an output shaft 26 of the reduction unit 10. The shaft 26 protrudes downwardly through the bushing 22 and comes to rest when the protruding ends of a pin 28, extending perpendicularly through a hole 26a in the shaft 26, engage the upper surface of the member 12a. After insertion of the shaft 26 into the bushing 22, a C-clip 30 is secured within a groove 26b formed in the shaft 26 immediately below the bushing 22 to prevent the shaft 26 from moving upwardly out from the bushing 22 while allowing the shaft 26 to rotate freely within the bracket 12.

Adjacent the bore 24 is a bore 32 also extending vertically through the member 12a of the bracket 12 for rotatably receiving a shaft 34 securely fixed to an idler gear 36. The lower end of the idler gear 36 is flat and rests upon the member 12a and contains two sets of perimetral gear teeth 36a and 36b. The teeth 36a extend outwardly from the idler gear 36 along its entire length and are equidistantly spaced around the perimeter of the idler gear 36. The teeth 36b are also equidistantly spaced around the perimeter of the idler gear 36 and are interposed between the full length teeth 36a in an alternating relationship. The length of the teeth 36b are approximately one-half that of the teeth 36a and extend along the lower half of the idler gear 36 for purposes described below. In a preferred embodiment, there are four each of the teeth 36a and 36b.

Figures 2, 3:
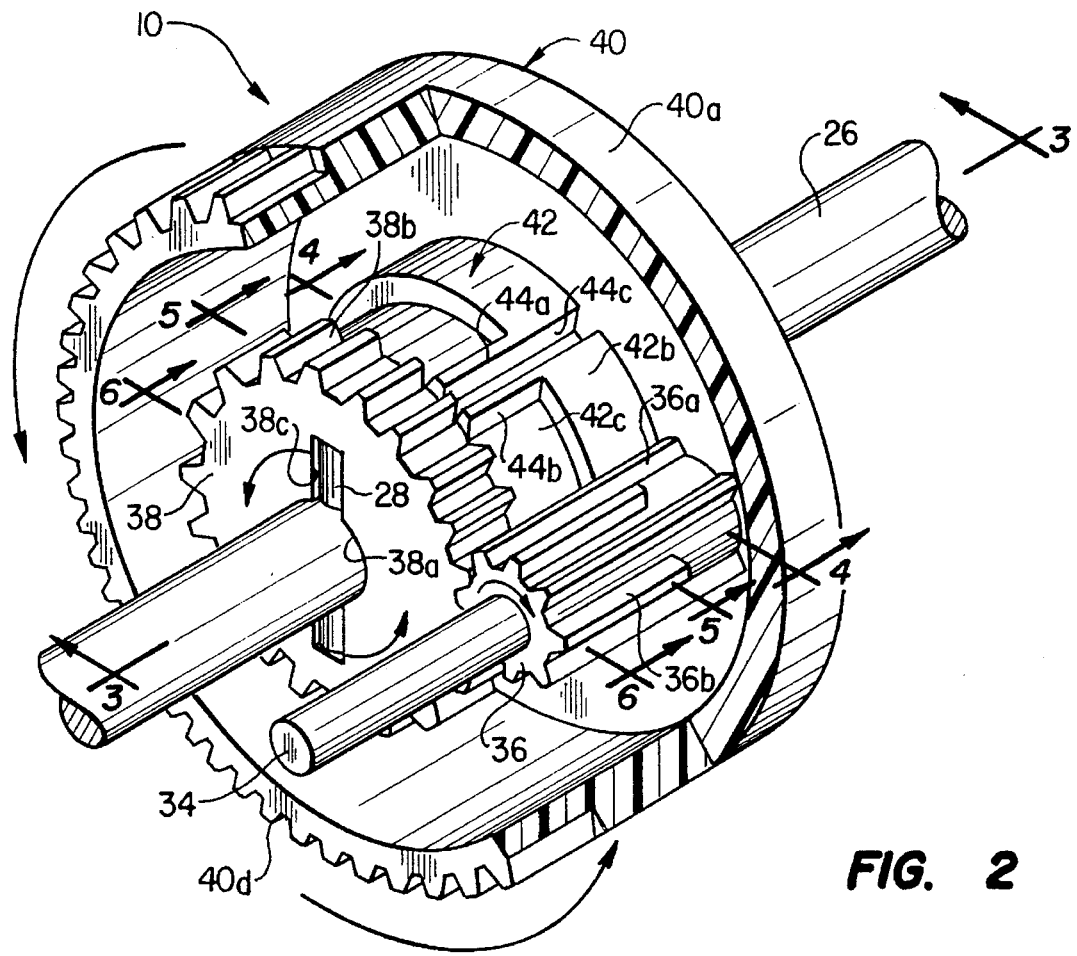
FIG. 2 is an enlarged, perspective view of the invention shown in FIG. 1.
FIG. 3 is a cross-sectional view taken along the line 3—3 of FIG. 2.

Referring to FIGS. 1 and 2, a driven gear 38 is mounted on the shaft 26 and has a central bore 38a for receiving the shaft. A plurality of gear teeth 38b are spaced about the perimeter of the gear 38 and mesh with both sets of the teeth 36a and 36b of the idler gear 36 to drive the gear 38 in response to rotation of the idler gear 36, as will be described. The lower end of the driven gear 38 is flat for resting upon the member 12a and has an elongated slot 38c (FIG. 2) for receiving the pin 28 by which the rotation of the driven gear 38 is transferred to the shaft 26.

An inverted cup-shaped drive gear 40 is provided which includes a cup-shaped body member 40a that surrounds the idler gear 36 and the driven gear 38, and which has a cylindrical portion 40b that projects outwardly therefrom. The cylindrical portion 40b defines a bore 40c that receives the shaft 26 in a manner to permit rotation of the gear 40 relative to the shaft 26. The gear 40 includes a plurality of exterior perimetral gear teeth 40d for meshing with corresponding gear teeth on the fluid meter (not shown) for driving the gear 40 whenever fuel is dispensed from the gasoline dispenser.

As better shown in FIGS. 2 and 3, a gear 42 is formed integrally with, and on the inner surface of, the drive gear 40 and has a central bore 42a aligned with the bore 40c for receiving the shaft 26. The gear 42 includes a relative large diameter, ring-shaped portion 42b extending from the inner surface of the gear 40 and a relative small diameter, ring-shaped portion 42c extending from the gear portion 42b. The lower end of the gear portion 42c is flat and rests upon the upper end of the driven gear 38. The outer surface of both the gear portions 42b and 42c are smooth with the exception that two, closely-spaced gear teeth 44a and 44b (FIG. 2) are formed on the outer surface of the gear portion 42c and define a slot 44c therebetween which also extends into the gear portion 42b. A C-clip 46 (FIG. 3) is secured within a groove 26c formed in the shaft 26 adjacent the projecting end of the cylindrical portion 40b of the drive gear 40 to prevent relative axial movement between the drive gear 40 and the shaft 26 while allowing the drive gear 40 to rotate freely on the shaft 26.

In a preferred embodiment, the gears 36, 38, 40 and 42 are all fabricated from a composition characterized by having a low dynamic coefficient of friction such as a resilient lubricated plastic like lubricated nylon, thereby reducing friction between the faces of the gears and their adjoining surfaces. As shown in FIGS. 1 and 3, channels are formed around the cylindrical portion 40b of the gear 40 to accommodate fluid flow during molding of the latter gear.

Referring to FIG. 1, a flexible steel-wrapped cable 48 extends between two connectors 50 and 52 secured to the shafts 26 and 20, respectively, by set screws 50a and 52a. Thus, any rotation of the shaft 26 caused by the dispensing of fuel from the gasoline dispenser as described below is transmitted by the cable 48 and the connectors 50 and 52 to the wheels 16 of the totalizer 14 causing the wheels 16 to rotate, thereby recording the amount of dispensed fuel.

The operation of the reduction unit 10 will now be described with reference to FIGS. 4–7 which detail the interaction of the gears 36, 38, 40 and 42. As fuel is dispensed from the fluid dispenser, the fluid meter (not shown) drives the drive gear 40 by meshing with the teeth 40d, which also drives the gear 42. The drive gear 40, and therefore the gear 42, will be described as being driven in a counter-clockwise direction as shown by the outer arrows in FIG. 4, it being understood that the drive gear 40 could alternatively be driven in the clockwise direction.

Figure 4:
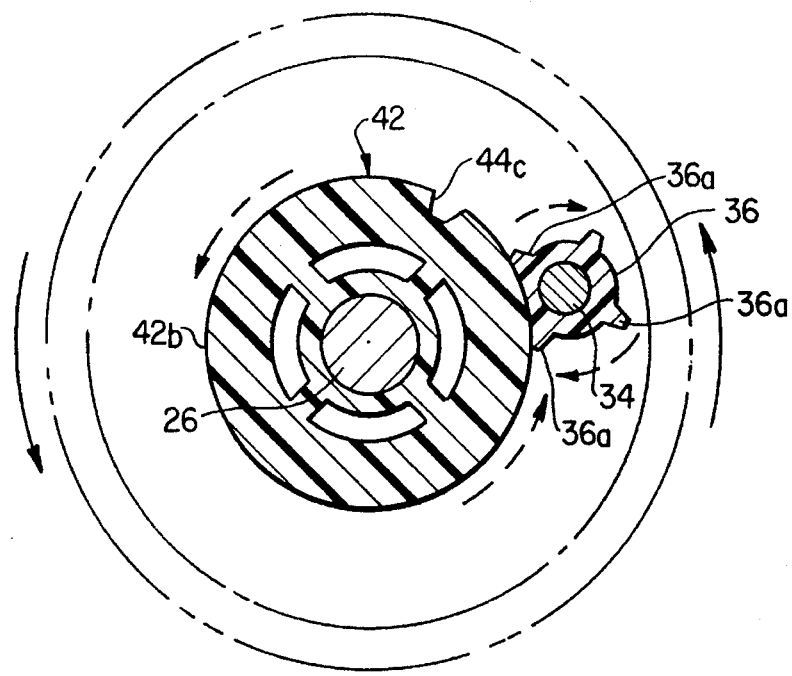
FIG. 4 is a cross-sectional view taken along the line 4—4 of FIG. 2.
Figure 5:
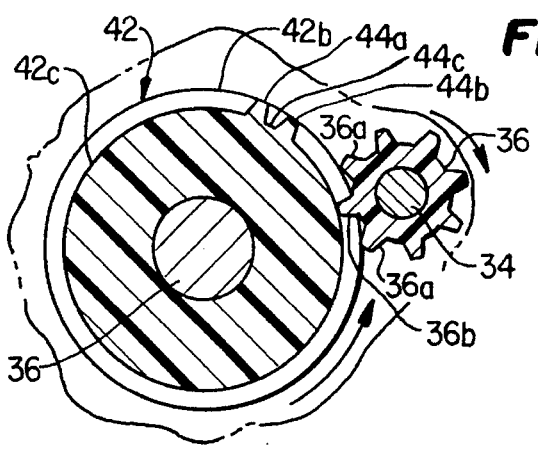
FIG. 5 is a cross-sectional view taken along the line 5—5 of FIG. 2.

As shown in FIG. 4, through most of the rotation of the gear 42, including the gear portion 42b, the idler gear 36 remains stationary with two of the full length teeth 36a of the idler gear 36 resting upon the smooth outer surface of the gear portion 42b. This stabilizes the idler gear 36 and prevents it from free wheeling during the remaining operation as will be apparent from the following. Simultaneously, and as shown in FIG. 5, the half-length tooth 36b of the idler gear 36 extending between the above-mentioned two full-length teeth 36a is precisely located in the path of the of the teeth 44a and 44b on the gear portion 42c as the latter also rotates counter-clockwise. As the gear 42 continues to rotate, the leading tooth 44a engages the latter tooth 36b, thus driving the idler gear 36 in a clockwise direction until one of the full-length teeth 36a meshes with the teeth 44a and 44b and the slot 44c causing the idler gear 36 to rotate a quarter turn. Rotation of the idler gear 36 is immediately halted as one of the full-length teeth 36a engages the smooth surface of the portion 42b, again placing the idler gear 36 in the stabilized position shown in FIG. 4 and precisely locating the next half-length tooth 36b in the path of the teeth 44a and 44b. Since, according to the preferred embodiment, there are four each of the full-length teeth 36a and the half-length teeth 36b, the gear 42 must rotate four complete times to cause the idler gear 36 to rotate a single turn resulting in a 4:1 gear ratio.

Figure 6:
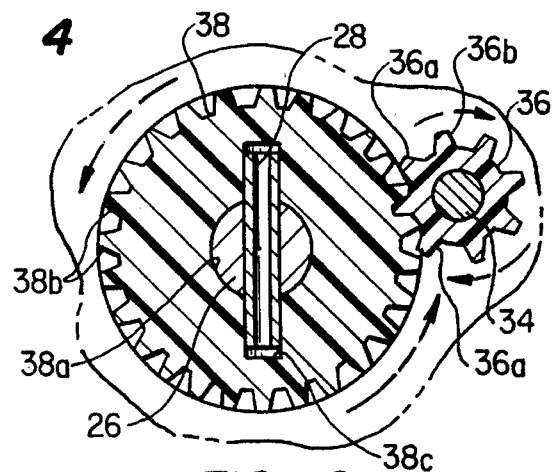
FIG. 6 is a cross-sectional view taken along the line 6—6 of FIG. 2.
Figure 7:
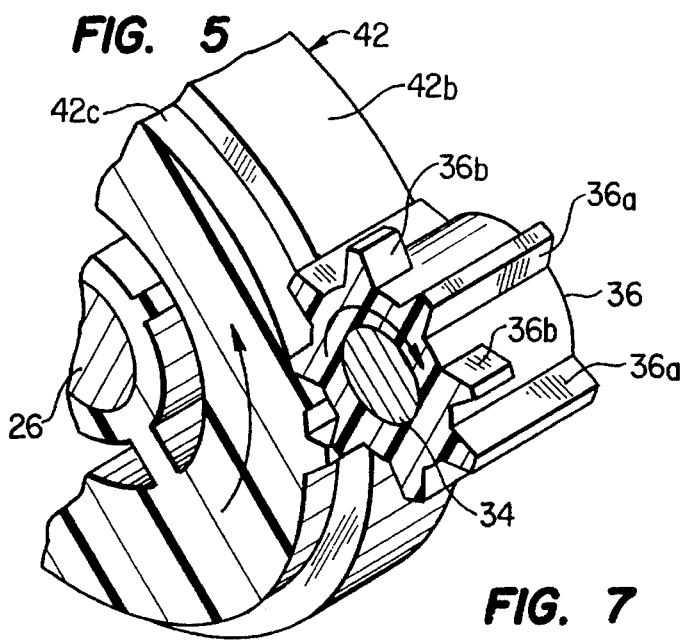
FIG. 7 is an enlarged, perspective view of the invention shown in FIG. 4.

As the idler gear 36 incrementally rotates a quarter turn in response to full rotation of the gears 40 and 42 as described above, both the full-length teeth 36a and the half-length teeth 36b engage the teeth 38b on the driven gear 38, as shown in FIG. 6, causing the driven gear 38 to rotate counter-clockwise. As the driven gear 38 rotates, the shaft 26 is rotated in the same direction as a result of the pin 28 extending in the slot 38c of the gear 38. In a preferred embodiment, the driven gear 38 contains twenty teeth 38b resulting in a reduction ratio of 2.5:1 between the idler gear 36 and the driven gear 38, and an overall reduction ratio of 10:1 between the drive gear 40 and the shaft 26.

Several advantages result from the foregoing. Generally, the reduction unit 10 provides a reduction in speed at which the mechanical totalizer 14 is run, thereby increasing its useful service life. The reduction unit 10 also prohibits tampering with the mechanism by concealing the idler gear 36 and the driven gear 38 within the drive gear 40. In addition, the reduction unit 10 can be easily retro-fit into existing gasoline dispensers as it utilizes the fluid meter and totalizer currently in use. This also minimizes the impact on external component design for new dispensers.

It is also understood that variations may be made in the present invention without departing from the spirit and scope of the invention. For example, the reduction ratios can be easily altered by changing the number of gear teeth on the various gears comprising the reduction unit. In addition, it should be recognized that the reduction unit 10 need not be used in a gasoline dispenser, but can be utilized in numerous different devices where a speed reduction is desired.

Although illustrative embodiments of the present invention have been shown and described, a wide range of modification, change and substitution is intended in the foregoing disclosure, and in certain instances some features of the invention may be employed without a corresponding use of other features. Accordingly, it is appropriate that the appended claims be construed broadly and in a manner consistent with the scope of the invention.

What is claimed is:

1. An incremental speed reduction unit, comprising:

a support;

a first gear rotatably supported on said support;

a second gear integrally connected to an inside surface of said first gear having at least one gear tooth radially extending from the surface thereof; and a third gear rotatably supported on said support and incrementally rotated by said second gear, said third gear comprising a first set of gear teeth extending the axial length thereof and a second set of gear teeth interposed between adjoining teeth of said first set extending for only a portion of the axial length thereof.

2. The incremental speed reduction unit of claim 1 further comprising an output shaft operatively connected to said third gear.

3. The incremental speed reduction unit of claim 2 further comprising a fourth gear operatively connected between said third gear and said output shaft for providing further speed reduction.

4. The incremental speed reduction unit of claim 3 wherein the reduction ratio between said first gear and said output shaft is 10:1.

5. The incremental speed reduction unit of claim 2 wherein said output shaft is rotatably connected to said support.

6. The incremental speed reduction unit of claim 5 wherein said first gear is rotatably supported on said support via said output shaft.

7. The incremental speed reduction unit of claim 6 further comprising a fourth gear supported on said output shaft and operatively connected between said third gear and said output shaft for providing further speed reduction.

8. The incremental speed reduction unit of claim 1 wherein said second gear comprises a larger diameter ring portion adjacent said first gear and a smaller diameter ring portion concentric with said larger portion, wherein said gear tooth of said second gear is flush with said larger portion and extends radially from said smaller portion.

9. The incremental speed reduction unit of claim 8 wherein two of said first set of gear teeth extending from said third gear engage said larger portion of said second gear to prevent rotation of said third gear except when one of said second set of gear teeth engages said gear tooth of said second gear.

10. The incremental speed reduction unit of claim 9 wherein a fourth gear engages both said first and second sets of teeth of said third gear.

11. A unit for transferring torque comprising:

a rotating member and an output shaft;

first gear means mounted on said shaft and comprising:
 a first set of gears in driving engagement with said member for rotating said first gear means relative to said shaft in response to rotation of said member; and
 a second set of gears;

second gear means in driving engagement with said first gear means, said second gear means being constructed and arranged so that said second gear means is idle during substantially all of the rotation of said first gear means but is periodically engaged by said second set of gears to incrementally rotate said second gear means a fraction of one complete rotation; and means responsive to said incremental rotation of said second gear means for rotating said shaft at said incremental rate.

12. The unit of claim 11 wherein said means for rotating said shaft comprises third gear means in driving engagement with said second gear means for rotating in response to said rotation of said second gear means; and means operatively connecting said third means to said shaft.

13. The unit of claim 12 wherein said second and third gear means have a first and second set of gears, respectively which engage and which have different gear ratios.

14. The unit of claim 11 wherein said first gear means comprises a cup-shaped hollow body having said first set of gears formed on its outer surface for engagement with said member and said second set of gears formed on its inner surface for engagement with said second gear means, said second gear means being disposed within said hollow body.

15. The unit of claim 14 wherein said means for rotating said shaft is also disposed within said hollow body.

16. The unit of claim 15 wherein said means for rotating said shaft comprises third gear means in driving engagement with said second gear means for rotating in response to said rotation of said second gear means; and means operatively connecting said third means to said shaft.

17. The unit of claim 16 wherein said third gear means extends over said shaft, and wherein said connecting means comprises a pin extending through said shaft and into a groove in said third gear means.

* * * * *